(12) United States Patent
Fish (10) Patent No.: US 8,032,885 B2
(45) Date of Patent: Oct. 4, 2011

(54) METHOD AND MEDIUM FOR COMBINING OPERATION COMMANDS INTO DATABASE SUBMISSION GROUPS

(75) Inventor: Eric Ian Fish, Kentfield, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1449 days.

(21) Appl. No.: 11/249,055

(22) Filed: Oct. 11, 2005

(65) Prior Publication Data

US 2011/0173619 A1    Jul. 14, 2011

(51) Int. Cl.
*G06F 9/46* (2006.01)
(52) U.S. Cl. ..................................... 718/101
(58) Field of Classification Search .............. 718/101
See application file for complete search history.

(56) References Cited

U.S. PATENT DOCUMENTS

| | | | |
|---|---|---|---|
| 6,317,753 B1* | 11/2001 | McGrath et al. | 707/703 |
| 6,678,714 B1* | 1/2004 | Olapurath et al. | 718/104 |
| 7,093,250 B1* | 8/2006 | Rector | 718/100 |
| 7,143,410 B1* | 11/2006 | Coffman et al. | 718/100 |
| 7,406,486 B1* | 7/2008 | Kundu et al. | 1/1 |
| 7,496,918 B1* | 2/2009 | Dice et al. | 718/100 |
| 7,814,080 B1* | 10/2010 | Luo et al. | 707/703 |
| 2003/0140029 A1* | 7/2003 | Messinger | 707/1 |

* cited by examiner

*Primary Examiner* — Meng An
*Assistant Examiner* — Blake Kumabe
(74) *Attorney, Agent, or Firm* — Kilpatrick Townsend & Stockton LLP (57) ABSTRACT

A computer readable medium storing executable instructions includes executable instructions to: receive a continuous stream of database transactions; form batches of database transactions from the continuous stream of database transactions; combine batches of database transactions with similar operations to form submission groups; identify dependencies between submission groups to designate priority submission groups; and apply priority submission groups to a database target substantially synchronously with the receipt of the continuous stream of database transactions.

16 Claims, 1 Drawing Sheet

FIG. 1

METHOD AND MEDIUM FOR COMBINING OPERATION COMMANDS INTO DATABASE SUBMISSION GROUPS

BRIEF DESCRIPTION OF THE INVENTION

This invention relates generally to electronic data storage. More particularly, this invention relates to optimized techniques for batched processing of database content.

BACKGROUND OF THE INVENTION

Organizations move data between different databases. For example, this may be done for data backup purposes or to share data across different databases and applications. Traditionally, this has been mostly accomplished in batches, where a batch is a set of tasks. Currently, batch processing is performed periodically, for example on a daily basis. Commonly, the batch processing is performed on a table-by-table basis.

Traditional batch methods are undesirable in many ways. Examples of these shortcomings are highlighted in a number of examples. In these examples, assume data is moving in one direction from a "source" database S to a "target" database T.

Take as an example a bank which holds customer balances in a BALANCE table in database S. A customer C has a balance of $500, which is recorded in BALANCE. Now C attempts to withdraw $400 at 11 am. The banking application checks the BALANCE table in S, allows the transaction and updates the customer's balance to $100 ($500−$400).

Now suppose that database S crashes in the middle of the day and the bank decides to use the backup database T as its database of record. Now customer C attempts to withdraw $300. Assume that database S is backed up to database T once per day at 2 am. This means that instead of reflecting the correct current balance of $100, the database reflects an old (stale) balance of $500, which does not include the transaction at 11 am. As a result, the new withdrawal will be mistakenly authorized.

This is a very obvious example of the shortcomings of a batch approach. Another shortcoming with the batch approach is the temporary lack of transaction consistency. For example, if two tables are updated as part of a single transaction, but applied in different applications when moving data from S to T, this violates the "all or nothing" aspect of database transactions. Another problem is a temporary lack of referential consistency in the database. It is possible that an "order detail" record could be inserted into T before the corresponding "order master" record to which the detail belongs exists in the target. Another problem is that it is difficult, and sometimes impossible, to move the entire database S to T, in a reasonable amount of time.

For these reasons and others, logical data replication systems came into being. These systems are able to detect and move the latest changes to tables, rather than entire tables or sets of data, enabling the data in T to keep much more closely in sync with data in S (often as low as a second or less, rather than a day or more, behind); this is often accomplished by reading database transaction logs for the latest changes. Data replication systems preserve the sequence of the application of new operations into T as they occurred in S. They also preserve the original transaction integrity, which assures that unless all items in a transaction are successfully applied to T, they are all rolled back. Data replication systems also preserve referential integrity. For example, they guarantee that if an order detail record is being inserted into T, than the corresponding order master record exists Despite the advantages of logical data replication systems, they also face a number of challenges. Performance is one challenge. The application which inserted data into S may have had many simultaneous transactions active and working in parallel. The replication system may be single threaded in order to assure that the original order remains intact, but in doing so, gives up much of the parallelism and performance of the source system, resulting in stale data in T. For performance reasons, a replication system may break up the workload of the transaction stream by table. For example, the ORDER_MASTER table in T may be inserted by one apply process and ORDER_DETAIL by a second process. In this case, it is possible to violate both transaction integrity and referential integrity constraints.

In view of the foregoing, it would be highly desirable to provide improved transaction data processing techniques. In particular, it would be desirable to provide more efficient techniques for applying database changes from a source to a target, while preserving both transactional and referential integrity rules.

SUMMARY OF THE INVENTION

The invention includes a computer readable medium storing executable instructions to receive a continuous stream of database transactions; form batches of database transactions from the continuous stream of database transactions; combine batches of database transactions with similar operations to form submission groups; identify dependencies between submission groups to designate priority submission groups; and apply priority submission groups to a database target substantially synchronously with the receipt of the continuous stream of database transactions.

Advantageously, the invention can be applied continuously to a stream of transactions at nearly the same rate that those transactions are created. Thus, reference is made to applying submission groups to a database target substantially synchronously with the receipt of the continuous stream of database transactions. This stands in contrast to traditional batch processing techniques, which are applied to a finite set of transactions at a scheduled time (e.g., the end of a day). The invention can be thought of as replacing a traditional non-batched, but near real-time technique with a near real-time batch technique. This is done in the context of transaction processing, rather than batch processing.

In one embodiment, the invention accepts batches of complete transactions from a capture process or capture queue. The batches may and usually do have a mix of different tables, and operations on tables (inserts, updates and deletes), as well as instructions for accessing different columns in the tables. Transactions are gathered into a larger transaction, referred to as a submission group. The application of the data to the target is optimized in a number of ways. For example, similar operations are sorted into distinct "buckets" (also referred to herein as submission groups) and are applied in fewer messages to the database server, taking advantage of database "array operation" capabilities. Each bucket is analyzed to identify buckets that can be submitted in parallel to the database. In one embodiment, buckets are applied in parallel, independent threads. In one embodiment, large transactions are selected and committed to reduce flushes to the transaction log for greater efficiency.

An embodiment of the invention performs efficient multi-row statements to a replicated database against a heterogeneous transaction load (different tables, inserts, updates, deletes) in near real-time, supports interleaved transaction streams by sorting interleaved transaction data into distinct transactions, groups smaller transactions into larger transactions, and within the larger transaction, sort statements into distinct "bucket types", and analyze the dependencies between different buckets to determine which operations in each bucket can safely be sent to the database and in what order. The invention executes these operations while preserving unique key and primary key constraints, by linking operations against the same row in original time sequence, and then ensures that they execute in that sequence, while allowing "independent" operations to be executed in larger buckets. The invention preserves referential integrity constraints by constructing linkages between different types of statements, and applying them in the proper order (e.g., dependent operations wait until other operations have executed). In the event of circular dependencies, the invention reverts to the original order of processing until circular dependencies are removed. The invention also provides an alternative method for analyzing parent/child key dependencies by linking changing values and ensuring operations execute against the same referential keys in the proper order. The invention efficiently supports conflict detection capabilities and active-active topologies within the multi-row execution context, reducing the overall cost of the replicated systems. The invention also enables replication between heterogeneous databases and schemas, including between different database vendors, versions, different table structures, and with transformed data. Further, the invention enables distribution of transactions, using both multi-row and single-row operations, across multiple threads simultaneously, while preserving transaction integrity, original row update order, and referential integrity.

Advantageously, the invention can be used to build a low cost disaster recovery/high availability grid of backup databases for a multiple number of host systems. These backups are able to create replica databases using a fraction of the CPUs that the original databases require for processing by using multi-row operations. In addition, a pool of backup databases can share a pool of reserved CPUs and memory; only those backup systems that become primary temporarily draw from the reserved CPUs and memory, enabling the total cost of all backup databases to be reduced significantly.

The invention can be used to build a lower cost reporting database by keeping the target reporting system in synchronization using multi-row operations. The reporting database can be maintained at a cost advantage proportional to the efficiency of multi-row operations compared with single-row operations.

The invention results in greater scalability since larger transaction volumes can be replicated with fewer resources and greater freshness of data (lower latency between source and target). The invention facilitates lower cost implementations because applying database transactions to the source is more efficient, fewer processing resources are required, and flexible backup system configurations are facilitated to replicate a set of data. This is accomplished while preserving all transaction and referential integrity rules.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The techniques of the invention are used to replicate transactional data with full integrity. The invention is applicable to relational databases and other types of databases and data sources as long as the data source application program interface supports certain operations, which are described below.

Figure 1:
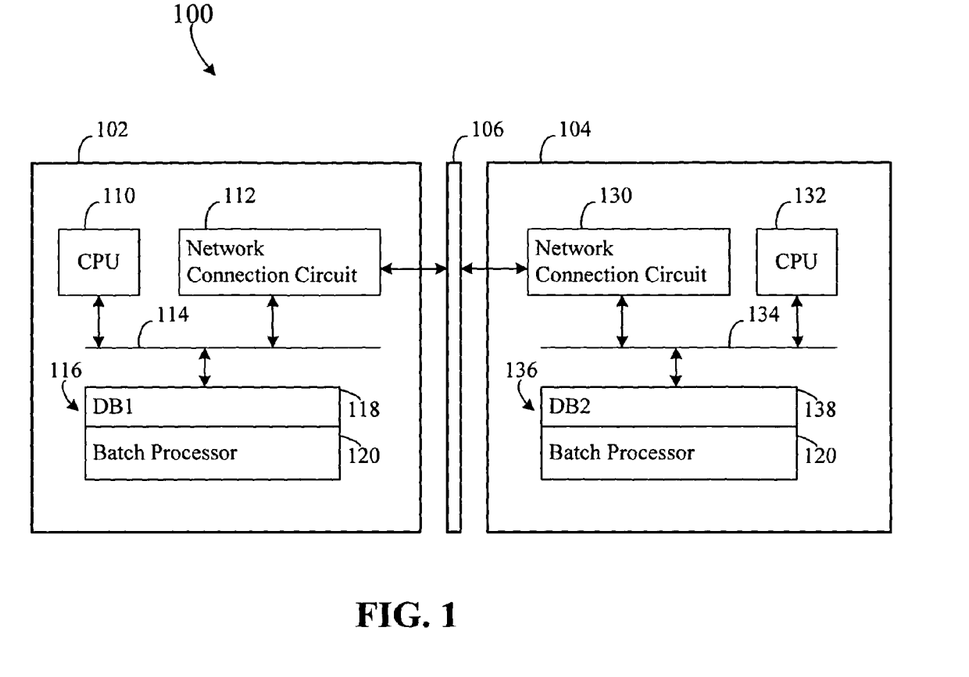
FIG. 1 illustrates a computer network configured in accordance with an embodiment of the invention.

FIG. 1 illustrates a network 100 configured in accordance with an embodiment of the invention. The network 100 includes a first computer 102 connected to a second computer 104 via any wired or wireless transmission channel 106. The first computer 102 includes standard components, such as a central processing unit 110 and a network connection circuit 112 linked by a bus 114. Also connected to the bus 114 is a memory 116. The memory 116 stores a first database or data source 118, which may be any known database or data source. A batch processor 120 includes executable instructions to process the data in the database 118 in accordance with operations discussed below. These operations are used to migrate the data to a different location in the network 100, such as computer 104.

The second computer 104 also includes standard components, such as a network connection circuit 130 and a central processing unit 132 linked by a bus 134. A memory 136 is connected to the bus 134. The memory stores a second database or data source 138. The memory 136 also stores a batch processor 120, which may include the same executable instructions of those of the batch processor 120 of the first computer 102. The batch processor 120 of the second computer 104 facilitates the processing of the data in the database 138 in accordance with embodiments of the invention.

The batch processor 120 of the first computer facilitates the transport of data from the first database 118 to the second database 138. Similarly, the batch processor 120 of the second computer 104 facilitates the transport of data from the second database 138 to the first database 118.

The batch processor 120 includes executable instructions to implement various operations of the invention, as discussed below. Consider an example with the following tables in a database:

ORDER_MASTER Table (columns are Order ID, Customer Name, key is Order ID)

|  | Order ID | Customer Name |
|---|---|---|
| Row 1 | 1 | Smith |
| Row 2 | 2 | Jones |
| Row 3 | 3 | Adams |

ORDER_DETAIL Table (columns are Order ID, Part ID, Quantity, key is Order ID, Part ID)

|  | Order ID | Part ID | Quantity |
|---|---|---|---|
| Row 1 | 1 | Car | 4 |
| Row 2 | 1 | Boat | 2 |
| Row 3 | 2 | Car | 2 |
| Row 4 | 3 | Truck | 1 |
| Row 5 | 3 | Car | 2 |

INVOICE Table (columns are Order ID and Amount, key is Order ID)

|  | Order ID | Amount |
|---|---|---|
| Row 1 | 1 | 100 |
| Row 2 | 2 | 300 |

A "unique key" (UK) in each table is a set of columns within the table used to uniquely identify each row within the table. For example, in the ORDER_MASTER table, Order ID is a unique key because it never repeats in the table. In the ORDER_DETAIL table, Order ID is not unique because it repeats (the value 1 appears twice). However, a combination of Order ID and Part ID is unique (there are no repetitions in (1,Car), (1,Boat), (2,Car), (3,Truck), (3,Car)). Note that it is possible for a table to have more than one unique key. Also note that a unique key that is not strictly defined by the database may be specified as a logical concept by a user performing replication (i.e., it is possible for a table not to have a pre-defined unique key).

Operations which alter the contents of any table are known generically as database change operations. These are inserts, updates or deletes. An insert results in a new row in a table; an update is a change to an existing row in a table (for example, changing the Quantity in the ORDER_DETAIL table from 4 to 5 where Order ID is 1 and Part ID is Car); and a delete is the removal of a row in a table.

One or more database operations are typically grouped into a database transaction. The application defines all of the operations which constitute a given transaction. One property of a database transaction in this context is that each database change in the transaction is applied or none are applied.

For example, if an application were to submit an insert for rows 1 and 2 of ORDER_DETAIL, along with row 1 of ORDER_MASTER, but the insert on ORDER_MASTER failed, an inconsistency in the database would be apparent—there would be ORDER_DETAIL rows without a corresponding ORDER_MASTER record. For this reason, if any of the database operations fails, they all "roll back" and no trace of the transaction is present in any trails. Transaction capabilities are a way to guarantee consistency in the database by providing "all or nothing" features.

Referential integrity is another tool used by databases and applications to enforce consistency. Referential integrity is a feature provided by relational database management systems that prevents users or applications from entering inconsistent data. Most relational database management systems have various referential integrity rules that are applied when creating a relationship between two tables. For example, the INVOICE table references an order from the ORDER_MASTER table; without a corresponding order in the ORDER_MASTER table, the entry in the INVOICE table makes no sense and should not be allowed. This is referential integrity.

The following terms apply in the context of referential integrity. INVOICE rows with Order IDs of 1 are said to be the child rows of ORDER_MASTER rows with Order IDs of 1; conversely, the ORDER_MASTER row is the parent of the corresponding INVOICE row.

A key field that identifies records in a different table is called a foreign key. So, for example, the Order ID in INVOICE is said to be the foreign key in the relationship between ORDER_MASTER and INVOICE.

Note that referential integrity is different from transactional integrity, because invoices may be submitted at a different time—in a different transaction—than the transaction which originally created the order. Also, referential integrity rules may be strictly defined in the database or may be enforced by application code.

Databases may enforce referential constraints in different ways. One way is a deferrable constraint, which means that the check to ensure consistency is deferred until all operations have been posted for a transaction. The other way is a non-deferrable constraint, which specifies that constraints are checked as operations are posted.

The pattern of activity in most transactional applications is that many transactions are in different states of progress during periods of activity, which is known as Interleaved Transactions. For example:

| Time | Transaction | Table | Operation Type | Key |
|---|---|---|---|---|
| t0 | 100 | ORDER_MASTER | Insert | 4 |
| t1 | 200 | ORDER_MASTER | Update | 2 |
| t2 | 100 | ORDER_DETAIL | Insert | 4, 'Car' |
| t3 | 200 | N/A | Commit | N/A |
| t4 | 300 | INVOICE | Insert | 2 |
| t5 | 100 | N/A | Commit | N/A |

Transactions on the database occur in parallel and don't necessarily commit in the order they are initiated. These events are recorded, typically, in a database transaction log, an event log, or an application log (known more generically here as a transaction log).

Note that until a Commit operation is submitted, all rows touched in a transaction are locked from access by any other transaction. No changes are permanent to the database until and unless a Commit is encountered for a given transaction.

Transaction replication is a method by which database operations occurring in the source database S can be applied to a target database T while retaining transaction integrity rules at T. Transaction replication has two essential steps: capture and apply (many other features may be implemented, such as data translation, filtering, mapping, routing, etc.).

Capture describes a process by which the transaction replication system retrieves the changes recorded in the transaction logs. Apply describes a process by which transaction operations retrieved by capture are applied, via a database API, to the target system.

Note that Capture and Apply may be the same processes or different processes, may exchange data directly over an inter-process channel or may exchange data asynchronously via file queues, database queues or equivalent methods.

A capture process may deliver transaction data to the Apply (via any of the methods above), in either an interleaved form or in a Transaction Sorted form. The sorted form defers the outputting of each transaction until its corresponding commit operation is seen. At that point, it outputs each operation in the transaction consecutively, rather than in an interleaved manner. For example, the sorted version of the above interleaved transaction set would be:

| Time | Transaction | Table | Operation Type | Key |
|---|---|---|---|---|
| t1 | 200 | ORDER_MASTER | Update | 2 |
| t3 | 200 | N/A | Commit | N/A |
| t0 | 100 | ORDER_MASTER | Insert | 4 |
| t2 | 100 | ORDER_DETAIL | Insert | 4, 'Car' |
| t5 | 100 | N/A | Commit | N/A |

In this scenario, the data has been reordered into commit order. Note also that the record from transaction 300 is not output until a commit is seen (if a rollback operation is seen, the transaction operations are discarded).

Even though operations may technically come out of order, they will never come out of order for a given unique key on a table. That is because, when a transaction changes a specific row, that row is locked for the duration of the transaction; this prevents a "parallel" transaction from updating that row (until the first transaction commits and unlocks the row). The commit for the locking transaction is guaranteed to occur before the commit to the second transaction.

When performing transaction replication against a sorted transaction stream, it is possible to group transactions in the Apply process. This means that transactions 200 and 100 can be grouped together into a single transaction without violating transaction integrity rules. But now, for transaction 200 to be committed, the group transaction logic also requires all operations in transaction 100 to be successfully applied, or the grouped transaction is rolled back. In this sense, additional transaction rules are applied at the target that didn't exist on the source database.

Therefore, there can be a many to one relationship between transactions at S, and transactions at T. But no transaction in S will be split across multiple transactions in T. Note that this also has significant performance implications, because commit operations typically cause significant database overhead, and fewer commits for the same operations means increased efficiency. Note also that if a grouped transaction fails, transaction replication can also fall back to a mode of applying the original transactions one at a time.

Replication is said to be active-active or multi-master if transactions can originate on any database. For example, in a two database scenario, database1 would function as both the originator of transactions which are replicated to database2, and database2 would also function as the originator of transactions which are replicated to database1.

In these types of scenarios, conflicts can arise, when database1 and database2 update the same row at nearly the same time. For example, imagine that database1 is adding $200 to the invoice amount for order 1, making it $300; database2, at nearly the same time, adds $400 to the invoice amount for order 1, making it $500 in database2. But when the transactions are replicated, the last change is incorrectly overwritten at each database, and database2 receives the update from database1 to make the amount $300, while database1 receives the update from database2, making it $500.

One conflict detection mechanism that identifies this problem is to compare non-key values—in this case, the prior value of amount—before applying the update. For example, when applying the update from database1 to database2, the SQL would be:

update invoice set amount=300 where orderID=1 and
        amount=100

This statement would fail, because database2 would have the new amount of $500. This would indicate a conflict. Conflicts can be resolved using any number of prior art techniques.

An access method provides a way for changing data within tables of a database. One type of access method is to use a programming interface, known generically as an Application Program Interface or API.

In most SQL databases, prepared statements can be used to increase the efficiency of applying changes programmatically to a database. A prepared statement has both standard SQL syntax and placeholders (parameters) for the actual data values that will be supplied each time the statement is executed. One advantage of a prepared statement is that the statement only needs to be parsed by the database one time (overhead is incurred each time parsing occurs); each time that statement needs to be executed again, with different values, the already parsed statement is submitted with different parameter values. For example, the following are distinct statements with parameters:

update ORDER_DETAIL set PartID=?paramPartID
        where OrderID=?paramOrderID update ORDER_DETAIL set PartID=?paramPartID,
        Quantity=?paramQuantityID where
        OrderID=?paramOrderID Two statements are considered equivalent statements if all of the following are true:
  the tables are the same
  the operations are the same (insert, update or delete)
  the columns being "set" by the statement are the same
  the columns being specified in the "where" clause are the same
For example:

update ORDER_DETAIL set PartID=55 where Orde-
        rID=22 update ORDER_DETAIL set PartID=321, Quan-
        tity=561 where OrderID=22 update ORDER_DETAIL set PartID=7823 where
        OrderID=33

The first and third statements are the same, because the operation, table, set list of columns, and where list of columns are equivalent. To execute the first update, the first statement above with parameters is parsed. Then the prepared statement (#1) is submitted with parameters PartID=55,OrderID=22. To execute the second update, the second statement above with parameters is parsed. Then the prepared statement (#2) is submitted with parameters PartID=321, Quantity=561. OrderID=22. To execute the third update, prepared statement #1 is reused (saving an extra parsing step), because the parameters are the same as in the first statement. Prepared statement #1 is submitted with parameters PartID=7823, OrderID=33.

Another efficiency booster offered by many databases is the submission of multiple rows to the database API in a single call. This saves roundtrips between the client program and the database server, and can reduce and eliminate much of the other overhead associated with processing a single operation. These features are known as multi-row or array operations.

Multi-row operations generally require that the statements to be executed are equivalent statements (as described above). Using the above example, the first and third statements could be sent in a single API call, because they are equivalent statements. In this case, an array of parameter values is passed to the API for a given parameter, one per row being updated (when a single row is updated, a single value is supplied, rather than an array).

Different databases also provide ways to distribute a transaction's work load across multiple processing threads, processes or even systems. If the transaction is large, the work can be distributed to multiple processing resources, and later committed or rolled back as a unit. This is known as a distributed transaction.

One way in which this occurs is known as two-phase commit. In the first phase, the participating threads all perform their own segment of work on the transaction and ensure that the work is persisted (e.g., via a prepare transaction operation). In the second phase, once an acknowledgement is received that all participating threads have persisted their portion of the work, a second phase commit operation ensures that the transaction is complete. If any of the threads fail or the master processing thread quits prematurely, all threads are rolled back.

In replication, changes that are captured from the source database can be selectively applied to the target database. This is done by interpreting the captured data, and interfacing with the appropriate API to execute database changes at the target.

Historically, in replication systems, apply operations have been submitted to APIs one row at a time. This is due to the fact that the workload is highly varied—different statements from different transactions are interleaved in the source environment. It is unlikely that consecutive statements will be equivalent statements in any large numbers.

Replication systems have traditionally operated in a single threaded fashion as well, at least on a per transaction basis. In interleaved transaction replication, a thread may be created for each individual transaction that is active at any given time, but this does not account for the ability to split workload across multiple threads. Usually, this isn't productive, because transactions are small, and coordinating between multiple transaction threads has some overhead in the database.

In replication systems which supply a transaction sorted operation stream to Apply, multi-threading is also difficult, because 1) the original ordering of updates on a specific row must be maintained; and 2) any referential integrity constraints must also be considered. Because thread execution does not always occur in the same order as submission of workload, a coordination mechanism must be developed to enable multi-threaded execution in this environment.

An embodiment of the invention combines the following concepts: Transaction Sorted streams of captured operations; combining small transactions on the source database into bigger transactions on the target database; submission of multiple equivalent statements in each transaction in a single database API call; and distribution of workload in a large transaction to multiple processes or processing threads.

As mentioned above, Transaction Sorted streams enable the combining of smaller transactions on the source database into larger transactions during the apply to the target database while preserving transaction integrity rules. One solution is to apply these operations as they are encountered by the Apply process, and simply "bracket" the transaction around larger numbers of operations than in the source (in the Transaction Sorted example above, the operations in transaction 200 and transaction 100 would be combined into a single transaction on the target).

Another alternative is to gather operations across a larger number of transactions into groups of equivalent statements. Consider this example (in transaction sorted order):

| Op | Transaction | Operation |
|---|---|---|
| 1 | 50 | update ORDER_DETAIL set Quantity = 3 where OrderID = 5 and PartID = "Truck" |
| 2 | 50 | insert into ORDER_DETAIL (OrderID, PartID, Quantity) values (5,"Boat",1) |
| 3 | 100 | insert into ORDER_MASTER (OrderID, CustomerName) values (1, "Smith") |
| 4 | 100 | insert into ORDER_DETAIL (OrderID, PartID, Quantity) values (1,"Car",4) |
| 5 | 100 | insert into ORDER_DETAIL (OrderID, PartID, Quantity) values (1,"Boat",2) |
| 6 | 200 | insert into ORDER_MASTER (OrderID, CustomerName) values (2, "Jones") |
| 7 | 200 | insert into ORDER_DETAIL (OrderID, PartID, Quantity) values (2,"Car",2) |
| 8 | 225 | update ORDER_DETAIL set Quantity = 4 where OrderID = 1 and PartID = "Car" |
| 9 | 225 | update ORDER_DETAIL set Quantity = 3, PartID="Car" where OrderID = 1 and PartID ="Boat" |

There are two statement types in this example: an insert of all columns into ORDER_MASTER and an insert of all columns into ORDER_DETAIL.

In this example, an embodiment of the invention sorts the operations into the following statement buckets or submission groups:

| Bucket | Op | Key | Operation |
|---|---|---|---|
| 1 | 1 | OD,5,"Truck" | update ORDER_DETAIL set Quantity = 3 where OrderID = 5 and PartID = "Truck" |
| 1 | 8 | OD,1,"Car" | update ORDER_DETAIL set Quantity = 4 where OrderID = 1 and PartID = "Car" |
| 2 | 2 | OD,5,"Boat" | insert into ORDER_DETAIL (OrderID, PartID, Quantity) values (5,"Boat",1) |
| 2 | 4 | OD,1,"Car" | insert into ORDER_DETAIL (OrderID, PartID, Quantity) values (1,"Car",4) |
| 2 | 5 | OD,1,"Boat" | insert into ORDER_DETAIL (OrderID, PartID, Quantity) values (1,"Boat",2) |
| 2 | 7 | OD,2,"Car" | insert into ORDER_DETAIL (OrderID, PartID, Quantity) values (2,"Car",2) |
| 3 | 3 | OM,1 | insert into ORDER_MASTER (OrderID, CustomerName) values (1, "Smith") |
| 3 | 6 | OM,2 | insert into ORDER_MASTER (OrderID, CustomerName) values (2, "Jones") |
| 4 | 9 | OD,1,"Boat" | update ORDER_DETAIL set Quantity = 3, PartID="Car" where OrderID = 1 and PartID ="Boat" |

In theory, each bucket can be submitted to the database API as a unit, for a total of four calls to the database to apply a total of nine operations. However, the order in which these operations is applied is crucial or operations will fail. For example:

bucket #1 includes an update to Order where OrderID=1 (op 8), but the insert of the row was performed in bucket #3 (op 3)—therefore, if bucket #1 is applied before bucket #3, the database will return a "not found" error if bucket #2 is submitted before bucket #3, the ORDER_DETAIL rows for orders 1 and 2 will precede the insertion of the corresponding ORDER_MASTER rows, violating referential integrity rules Note that if the row from the source database has another unique identifier, it is not necessary to use the row's primary key column values as the chief tracking mechanism. For example, in an Oracle database a unique RowID is specified by the Oracle database for each row.

An embodiment of the invention is configured to gather many operations, and usually many small transactions, from the source into a larger group transaction on the target. The techniques described above are used to sort operations into buckets.

The following factors must be considered when applying multi-row operations:

1) operations to the same row occurring more than once must be executed in the correct (original) sequence (in the above example, operation 4 in bucket #2 must precede operation 8 in bucket #1, otherwise, an update is applied to a non-existent record)

2) operations that update unique keys must be sequenced properly 3) operations that require referential integrity to be preserved must be executed in the correct order (operation 3 in bucket #3 must precede operations 4 and 5 in bucket #2)

The first rule to ensure proper sequential order is maintained across different buckets that contain operations on the same row is to execute the bucket which contains the first operation prior to the bucket which contains the second operation on that row, the second before the third, and so on. However, consider the following scenario:

| Op | Bucket | Operation | Key |
|---|---|---|---|
| 1 | 1 | Insert | A |
| 2 | 1 | Insert | B |
| 3 | 2 | Delete | X |
| 4 | 2 | Delete | B |
| 5 | 1 | Insert | C |
| 6 | 1 | Insert | B |
| 7 | 1 | Insert | E |

In this example, the delete in operation 4 must come after insert in operation 2, but before the insert in operation 6. If all of bucket 1 were to be applied first, a duplicate row error would occur when applying operation 6, because the bucket already inserted the row in operation 2. Conversely, if bucket 2 is applied first, then the delete in operation 4 would fail, because the row hasn't been inserted yet (operation 2 in bucket 1).

As a consequence, the rule for applying buckets must be modified. Buckets may be split across multiple rounds. In the above example, application of operations into particular rounds could be executed as follows while preserving key order:

| Op | Bucket | Operation | Key | Round |
|---|---|---|---|---|
| 1 | 1 | Insert | A | 1 |
| 2 | 1 | Insert | B | 1 |
| 3 | 2 | Delete | X | 2 |
| 4 | 2 | Delete | B | 2 |
| 5 | 1 | Insert | C | 3 |
| 6 | 1 | Insert | B | 3 |
| 7 | 1 | Insert | E | 3 |

Even though operations 1, 2 5, 6 and 7 are in the same bucket, operation 2 in bucket #1 must be executed before operation 4 in bucket #2, which must be executed before operation 6 in bucket #1. This means that the execution must be split into three rounds.

An embodiment of the invention enforces this rule to track all row keys as buckets are constructed. If an operation has the same key as a prior operation (on the same table), then the prior operation's bucket is marked for immediate execution (described below). Consider the following example with the following state when operation 4 is reached.

| Op | Bucket | Operation | Key | Round |
|----|--------|-----------|-----|-------|
| 1  | 1      | Insert    | A   |       |
| 2  | 1      | Insert    | B   |       |
| 3  | 2      | Delete    | X   |       |
| 4  | 2      | Delete    | B   |       |

When examining operation 4, it can be observed that a row with the same key was seen in a prior operation (key B, operation 2). As a result, the operations (1 and 2) in bucket 1 are executed (subject to execution of "dependent buckets" as described below), as shown by marks in the Round column below.

| Op | Bucket | Operation | Key | Round |
|----|--------|-----------|-----|-------|
| 1  | 1      | Insert    | A   | 1     |
| 2  | 1      | Insert    | B   | 1     |
| 3  | 2      | Delete    | X   |       |
| 4  | 2      | Delete    | B   |       |

The next few operations are then retrieved:

| Op | Bucket | Operation | Key | Round |
|----|--------|-----------|-----|-------|
| 1  | 1      | Insert    | A   | 1     |
| 2  | 1      | Insert    | B   | 1     |
| 3  | 2      | Delete    | X   | 2     |
| 4  | 2      | Delete    | B   | 2     |
| 5  | 1      | Insert    | C   |       |
| 6  | 1      | Insert    | B   |       |

In operation 6, key B is encountered. Because there is a key B in operation 4, bucket 2 (operations 3, 4) are executed. Finally, when the end of available operations is observed, the remainder of bucket 1 (operations 5,6,7) is executed in round 3.

| Op | Bucket | Operation | Key | Round |
|----|--------|-----------|-----|-------|
| 1  | 1      | Insert    | A   | 1     |
| 2  | 1      | Insert    | B   | 1     |
| 3  | 2      | Delete    | X   | 2     |
| 4  | 2      | Delete    | B   | 2     |
| 5  | 1      | Insert    | C   | 3     |
| 6  | 1      | Insert    | B   | 3     |
| 7  | 1      | Insert    | E   | 3     |

This is like tracking the same rows. When attempting to detect whether an operation modifies the same row as a prior operation, it is necessary to examine, in update operations, the before image value of that key and compare it with keys encountered so far. If the before image key value is the same as a prior after image key value of a row, then the update is to that row. Those operations can then be linked in the proper order (op 1 after key=A, op 2 before key=B, after=C, op 3 before key=C, after=D, op 4 before key=D, after key=D–all operations are on the same row).

In the instance where an update operation occurs in the same bucket to the same key, the execution of the bucket can be deferred. For example:

| Op | Bucket | Operation | Key | Round |
|----|--------|-----------|-----|-------|
| 1  | 1      | Update    | A   | 1     |
| 2  | 1      | Update    | B   | 1     |
| 3  | 1      | Update    | A   | 1     |
| 4  | 2      | Delete    | A   | 2     |

Note that when encountering operation 3, even though key A was already seen in operation 1, one can defer execution of the bucket until operation 4 (where key A is encountered in a different bucket). The reason is that key order is maintained within bucket 1, and since there are no intervening changes to the row with key A between operations 1 and 3, all operations in bucket 1 can be executed together.

This method is advantageous in applications where operations update the same row repeatedly, using the same SQL (i.e., the same list of columns in the update). Rather than triggering execution based on observing the same row twice, rows which appear more than once can be deferred for a different execution round than rows that do not.

For example:

| Op | Bucket | Operation | Key | Round | Predecessor Row Op |
|----|--------|-----------|-----|-------|--------------------|
| 1  | 1      | Insert    | A   | 1     |                    |
| 2  | 1      | Insert    | B   | 1     |                    |
| 3  | 2      | Delete    | X   | 2     |                    |
| 4  | 2      | Delete    | B   |       | 2                  |
| 5  | 1      | Insert    | C   | 1     |                    |
| 6  | 1      | Insert    | B   |       | 4                  |
| 7  | 1      | Insert    | E   | 1     |                    |

In this scenario, the only successor row key is B and successor row operations are 4 and 6. Therefore, the operations (in all buckets) that do not have row ordering dependencies (rounds 1 and 2 above) are executed, leaving the following:

| Op | Bucket | Operation | Key | Round | Predecessor Row Op |
|----|--------|-----------|-----|-------|--------------------|
| 4  | 2      | Delete    | B   | 3     |                    |
| 6  | 1      | Insert    | B   |       | 4                  |

Next, the same logic is used to select bucket 2 operation 4 for execution, leaving:

| Op | Bucket | Operation | Key | Round | Predecessor Row Op |
|----|--------|-----------|-----|-------|--------------------|
| 6  | 1      | Insert    | B   |       | 4                  |

Operation 6 is executed in the last round.

An embodiment of the invention allows further deferral of execution. Consider the following example.

| Op | Bucket | Operation | Key | Updated Cols | Round prior method (forced by op) | Round (new method) |
|----|--------|-----------|-----|--------------|-----------------------------------|--------------------|
| 1  | 1      | Insert    | A   | C1, C2, C3   | 1 (2)                             | 1                  |
| 2  | 2      | Update    | A   | C2           | 2 (3)                             | 2                  |
| 3  | 3      | Update    | A   | C2, C3       | 3 (6)                             | 3                  |
| 4  | 3      | Update    | A   | C2, C3       | 3 (6)                             | 3                  |

-continued

| Op | Bucket | Operation | Key | Updated Cols | Round prior method (forced by op) | Round (new method) |
|---|---|---|---|---|---|---|
| 5 | 1 | Insert | B | C1, C2, C3 | 5 (none) | 1 |
| 6 | 2 | Update | A | C2 | 4 ((8)) | 2 |
| 7 | 1 | Insert | C | C1, C2, C3 | 5 (none) | 1 |
| 8 | 4 | Delete | A |  | 6 (none) | 4 |

Note that in the prior method, operation 2 would force bucket 1 to execute with just one operation outstanding (op 1). However, as long as the buckets execute in the proper order, the entire contents of each bucket can be submitted in each round—this reduces the total number of rounds from 6 to 4. However, the following scenario poses a problem:

| Op | Bucket | Operation | Key | Round (new method) | Round (modified) |
|---|---|---|---|---|---|
| 1 | 1 | Insert | A | 1 | 1 |
| 2 | 1 | Insert | B | 1 | 1 |
| 3 | 2 | Delete | A | 2 | 2 |
| 4 | 3 | Update | B | 3 | 3 |
| 5 | 2 | Delete | B | 2 | 2 |

If bucket 2 executes before bucket 3, the operations on key B would be ordered insert (op 2), delete (op 5), update (op 4). This would result in an error on the update (record not found), since the record was already deleted. Therefore, the challenge is recognizing the proper situations in which this method can be applied.

Attention now turns to ensuring proper unique key order. Any changes to unique keys that are not the primary key must also be properly sequenced. For example:

| Op | Bucket | Operation | Primary Key | Updated Cols | Unique Key Value Before | Unique Key Value After |
|---|---|---|---|---|---|---|
| 1 | 1 | Update | C | C2, C3 | M | M |
| 2 | 2 | Update | B | C2 | Y | Z |
| 3 | 1 | Update | A | C2, C3 | X | Y |

If executed using one of the above methods, all of bucket 1 would be executed in the first round, and bucket 2 would be executed in the second round, because the primary keys do not conflict. However, were this to occur, operation 3 would execute before operation 2. In this case, the row where key=B has a unique key value of Y when operation 3 attempts to execute, resulting in duplicate index error condition, since operation 3 is attempting to update the unique key value to Y. Y must change to Z before X can change to Y, since at most one row can hold any given value at a point in time.

As a result, the same rules that are applied using primary keys must also be applied to any additional unique keys in a table:

if when encountering a row, a prior operation is seen for a unique key in any row, the bucket to which that prior operation belongs should be executed the exception to the above are when the unique key value didn't change from one operation to the next, the bucket execution can be deferred a but the changes to the unique key must be linked when updates on the same unique key occur in the same bucket, they can be deferred until an operation with the same unique key value occurs in a different bucket A more crude general rule could be applied to always execute changes to tables with unique keys immediately (exempt them from multi-row operations). Since in many applications a majority of transaction activity does not affect unique keys (other than primary keys), operations on the minority of tables that do have unique keys can be executed immediately without a significant decrease in overall performance.

Ensuring that non-deferrable referential integrity constraints are preserved is another aspect of the invention. Note that when referential integrity constraints are deferrable to the end of a transaction, no additional features are necessary—any constraints must only be true at the end of the transaction and the order of operations within the transaction is therefore irrelevant (as long as rules for primary keys and unique keys are obeyed, as described above).

For the purposes of this example, assume a relationship between a parent table PARTS (PartID, Desc columns) and ORDER_DETAIL (which contains a PartID column). In this relationship, when an ORDER_DETAIL row is created or changed, a corresponding row must exist in the PARTS table, where a corresponding parent key PARTS.PartID exists for the child key ORDER_DETAIL.Part ID.

| Op | Transaction | Bucket | Operation |
|---|---|---|---|
| 1 | 50 | 1 | insert into ORDER_DETAIL (OrderID, PartID, Quantity) values (5,"Boat",1) |
| 2 | 100 | 2 | insert into PARTS (PartID, Desc) values ("Car", "4 wheels") |
| 3 | 100 | 1 | insert into ORDER_DETAIL (OrderID, PartID, Quantity) values (1,"Car",4) |

In the original transaction 100, the PARTS parent row was properly inserted into the source database. However, at the end of the grouped transactions (50 and 100) at the target, without any modifications to the earlier rules, the bucket of inserts to ORDER_DETAIL would be executed prior to the bucket containing the insert to PARTS. This would violate the referential integrity constraint that a PARTS record precedes any related ORDER_DETAIL records.

The following table describes the rules for ensuring referential integrity across buckets where there is a relationship between a parent and child.

| Parent Operation | Child Operation | Execution | Comments |
|---|---|---|---|
| Insert | Insert | Parent First | If child key precedes the parent key, could violate referential integrity rules. For example, if PARTS.PartID = "Car" does not exist, and ORDER_DETAIL.PartID = "Car" is inserted, the constraint is violated. |

-continued

| Parent Operation | Child Operation | Execution | Comments |
|---|---|---|---|
| Insert | Update | Parent First | Possible new value for parent key must precede the possible creation of a new child key (via an update from an old child key). For example, PARTS.PartID = "Plane" could be inserted, followed by an update to the ORDER_DETAIL.where PartID = "Car" setting PartID = "Plane". Were these operations reversed, the new value of the ORDER_DETAIL row would have a child key value that did not have a corresponding parent key. |
| Insert | Delete | Doesn't matter | Constraint on parent goes away. |
| Update | Insert | Parent First | Possible new value in parent key must precede new instance of child key. For example, PARTS.PartID could be changed to "Jet" before ORDER_DETAIL.PartID is inserted with value of "Jet". But if the reverse order were applied, the part would not exist when the detail row was inserted. |
| Update | Update | Doesn't matter | The relationship where child.PartID = parent.PartID could be violated regardless of order. This scenario would therefore not be possible assuming the same constraints on the source database. For example, if PARTS.PartID were updated from "Car" to "Boat" and the corresponding ORDER_DETAIL row is then updated from "Car" to "Boat", this would not have been possible in the original database, regardless of which operation were applied first. In the instance where PARTS was updated first, this would cause the ORDER_DETAIL row to have no corresponding entry in parts for "Car"; but in the opposite case, if ORDER_DETAIL of "Boat" was changed to "Car" first, there would be no corresponding entry in PARTS.PartID (yet) were the value was "Car". Therefore, if the source database has the same referential integrity constraints as the target, then an update to both tables is not possible where a parent key/child key relationship exists. |
| Update | Delete | Child First | If parent key X changes to Y before child key X is deleted, violates the constraint. When child key X is deleted, parent key X is free to change to Y. |
| Delete | Insert | Doesn't matter | If a new value is inserted for the child key, the corresponding the parent key must already exist. If a row was deleted from the parent table, it must not contain a row that is needed by the child row. |
| Delete | Update | Child First | If child changes from X to Y, then parent key value X cannot be deleted until child changes. |
| Delete | Delete | Child First | If parent X is deleted before child X, the child is incorrectly orphaned. |

The relationship between two buckets that have to be executed in a specific order is described as follows: the predecessor bucket is the bucket that must be executed first; the successor bucket is the bucket that must be executed last.

Alternate embodiments of the invention use different mechanisms for tracking referential integrity. One technique is to track the actual child and parent key relationships in a way similar to tracking primary and unique keys described earlier. Consider this example.

| Op | Bucket | Operation | Parent Key Entry | Round |
|---|---|---|---|---|
| 1 | 1 | insert into ORDER_DETAIL (OrderID, PartID, Quantity) values (5,"Boat",1) | PARTS.PartID, "Boat" | 1 |
| 2 | 2 | insert into PARTS (PartID, Desc) values ("Car", "4 wheels") | PARTS.PartID, "Car" | 1 |
| 3 | 3 | update ORDER_DETAIL set PartID = "Car" where OrderID = 1 and PartID = "Boat" | PARTS.PartID, "Car" (successor to op 2) | 2 |
| 4 | 1 | insert into ORDER_DETAIL (OrderID, PartID, Quantity) values (6,"Car",2) | PARTS.PartID, "Car" (successor to op 2) | 2 |

In this example, operation 1 can be executed immediately, since there are no PARTS rows anywhere with the same value for PartID in the queue. However, not all of bucket 1 can be executed immediately, because the insertion of PARTS.PartID value of "Car" in operation 2 must precede operation 3.

The general technique is to track parent/child key relationships. A separate memory table (e.g., a hash table), is used to link the same instance of each key in memory. When an existing key is found, the operation is marked as a successor operation and is linked to its predecessor operation.

When deciding which operations to execute in which round, all operations that are not successor operations are executed first. This results in the execution sequence noted above.

The main limitation with this method is that it requires the entire parent/child key to be present in all operations, even when the key values did not change. This is frequently not the case in update statements, in which only the primary key, plus any columns that changed, are always available to the system.

The invention uses various techniques to combine rules into a proper execution sequence. Multi-row operations must be sequenced properly to ensure both referential integrity rules and that any row changed more than once in the transaction ends up with the correct values. This may be accomplished in the following manner.

The buckets created during the gathering of transaction operations are referred to collectively as queued buckets. The goal is to apply all queued operations held in the queued buckets. The basic method for applying all queued operations is to make a number of passes through the queued buckets to see what can be executed in each pass.

If a given queued bucket has a predecessor bucket, it is not an immediate candidate for execution (the predecessor bucket must be executed first). All queued buckets without predecessor buckets are marked for execution. Once a bucket is marked for execution, each operation is analyzed to see if any of its operations are successor row operations. If so, such operations are deferred until later, but the remainder of the bucket can be executed.

Once all buckets are analyzed, eligible buckets are submitted for execution. Operations in eligible buckets that were not successor rows are executed via multi-row operations on the database.

After operations complete, dependencies are analyzed again to see what remains. This can update both predecessor/successor bucket relationships, as well as predecessor/successor row relationships—if the predecessor is removed, the successor can be executed. These passes continue until all operations have been executed.

It is also possible that predecessor/successor relationships cannot always be smoothly resolved. Since the relationships are generalized here, circular relationships are possible. Therefore, in the event that a given pass does not uncover any new operations for execution, a pass is made in which the oldest outstanding operation is executed, along with any subsequent operations in the same bucket that are older than the oldest operation in any predecessor buckets. For example:

| Op | Bucket | Operation | Comments |
| --- | --- | --- | --- |
| 1 | 1 | insert into ORDER_DETAIL (OrderID, PartID, Quantity) values (1,"Car",4) | predecessor is bucket #2 |
| 2 | 1 | insert into ORDER_DETAIL (OrderID, PartID, Quantity) values (2,"Blimp",1) | predecessor is bucket #2 |

-continued

| Op | Bucket | Operation | Comments |
| --- | --- | --- | --- |
| 3 | 2 | update PARTS set PartID = "Bike" where PartID = "Scooter" | predecessor is bucket #3 |
| 4 | 3 | delete from ORDER_DETAIL where OrderID = 1 | no predecessors |

According to the above rules, in the first round of execution, the eligible bucket is the bucket with no predecessors, bucket #3. However, bucket #3 cannot be executed, because the only operation within it, operation #3, must be executed after operation #1 (otherwise, a record not found error will occur). But if bucket #3 is not executed, neither of the other buckets can be executed, and no progress can be made.

When it is determine that no progress can be made, the system cycles through the buckets in order, starting with the one with the oldest outstanding operation first (in this case, bucket 1). It then executes those operations in bucket 1 that precede all other operations (operations 1 and 2), leaving the following:

| Op | Bucket | Operation | Comments |
| --- | --- | --- | --- |
| 3 | 2 | update PARTS set PartID = "Bike" where PartID = "Scooter" | predecessor is bucket #3 |
| 4 | 3 | delete from ORDER_DETAIL where OrderID = 1 | no predecessors |

At this point, the system falls back to the original mode of operation, selecting the bucket with no predecessors, #3. It applies #3, then applies #1, completing the queue. Thus, the invention identifies dependencies between buckets or submission groups and designates priority buckets or submission groups for execution in the order specified by the designated priority.

The multi-row operational techniques of the invention can be applied together with multi-threading techniques to achieve greater throughput. This is done by "sharing" a transaction across two or more threads, and then committing those threads under the same transaction umbrella. This enables apply operations in a transaction to execute in parallel with each other.

One technique for doing this in many databases is supplied by the two phase commit capability. Work in a transaction (whether single row or multi-row) is divided across threads by analyzing the dependencies in the transaction. Successor rows and buckets cannot be submitted until predecessor rows and buckets have been submitted to each thread and are subsequently confirmed as complete. Until a predecessor bucket (referential integrity rule) or row (primary and unique key ordering rule) has actually completed, the submission of corresponding successors is not guaranteed to be in proper order. At that point, the entire transaction can be committed. One example of how this can be accomplished is in the two phase commit protocol supported by many databases. In phase I, the individual threads perform their portion of database activity and subsequently perform a phase 1 commit (also known as prepare). Once the master thread has detected successful prepares by each participating thread, it then issues a phase 2 commit (also known as a final commit).

If an error is encountered on any row being changed in a multi-row operation, the replication system may perform custom error handling. One method is to rollback the entire transaction (including changes performed by other buckets)

and replay individual operations in a single row at a time. This also enables those transactions in the larger group that had no inherent issues to be successfully submitted to the database and any problems to be isolated to the actual offending transaction.

Some operations cannot be submitted in multi-row or cannot be feasibly submitted (such as inserting LOBs into the database). In these situations, the system can fallback to a row at a time mode and:
- perform all existing operations in the queue preceding the current operation, using the methods described above
- fallback to single operation at a time mode for the current operation
- resume the prior methods for subsequent operations When two databases are being replicated to each other, depending on database and application design, it is possible for conflicts to arise. For example, assume that a customer record exists in systems S and T, and that the current balance is $500. Subsequently, the customer withdraws $100, leaving a balance of $400 on system S. Nearly simultaneously, before the transaction from S is replicated to T, the customer withdraws an additional $100, this time from system T (this can occur for many reasons, such as adjacent terminals are connected to different systems). The balance before any replication on each system is $400, but after replication it is also $400 incorrectly—the updates applied by replication reflected an ending balance of $400 in each case. This is one common form of conflict.

As a result, many replication systems employ conflict rules, such as the following:
- carry both the before value ($500) and the after value ($400) of balance to the target system
- lookup the row to which an update is being applied, and make sure that the before value from the original system matches the before value of the target system
- if the values don't match, as in the example, declare a conflict and don't replicate the data as is (conflict resolution may involve a variety of prior art mechanisms)

In these cases, to maintain efficiency it may be necessary to employ multi-row operations and multi-threading for row operations that may be in conflict. In order to do so, the replication system includes any conflict detection columns in its update statement; for example, if the statement without conflict detection is:

update CUSTOMER set Balance=$400 where CustomerID=123 the statement with conflict detection is:

update CUSTOMER set Balance=$400 where CustomerID=123 and Balance=$500

Note that the second statement would result in a "record not found" error in the above example, and reveal a possible conflict.

Operations executed in a single source database transaction may reach into the millions. At a point well before that it becomes inefficient and very memory intensive to queue rows, track key relationships and perform the other functions listed above.

When a large transaction is encountered, it can be broken up into multiple queues. For example, if a transaction includes 2500 operations, the first 1000 operations might be submitted in queue #1, the second 1000 operations in queue #2, and the final 500 operations in queue #3.

The techniques of the invention can be applied to target databases even when the source database is different (e.g. Oracle to Sybase), has a differing schema (different table names and layouts), only contains some of the rows and columns from the source (overlapping data), and/or may have performed transformation on the changing data stream. As with other logical replication systems, the invention requires that the source provide changes to the same row in their original order, and that row changes are presented in the correct order so that referential integrity constraints are not violated.

Those skilled in the art will appreciate that the invention can be used to build a low cost disaster recover grid. Due to the relative efficiency of multi-row operations over single-row operations, the processing of the invention can be used to build lower cost backup systems. This is due to the database operation patterns of the source system, compared with the target.

On many source transaction databases, the dominant activity is single-row operations executed by multiple CPUs. When the transaction volumes are V and the number of single row operations supported by a single CPU is SR, then the number of CPUs required by the system hosting the source database, excluding other requirements, is V/SR. The number of multi-row operations on the target system is known as MR. The processing requirement on the target system is therefore V/MR.

As an example, if the number of single-row operations supported by a database configuration for a particular application is 2000, and the number of multi-row operations supported by the same database configuration is 8000, then theoretically, the target database requires only 25% of the processing required by the source database (MR/SR).

So at a minimum, data backup can be provided at a fraction of the cost using multi-row methods than can be achieved using single-row operations. However, this has limited usefulness, since after a switchover to the backup, the backup system will need all of the processing power that was available to the source system, because it is falling back to a single row operation mode.

However, computer blade/grid technology combined with multi-row capabilities enables cost savings, as in the following example:
- 10 source databases are replicated to 10 target databases
    - the source databases can be located in the same or different locations
- the 10 target databases are hosted by a common grid of CPUs (same location)
- assume that multi-row operations are 4 times more efficient than single-row operations, and that each source database requires 8 CPUs to operate effectively
- the minimal number of target CPUs therefore required are therefore 8/4=2
- the total number of source CPUs is 10*8=80 (SCPUS), the minimal number of target CPUs is 10*2=20 (TCPUS)
- an additional number of CPUs is "reserved" for switchover to the backup; per backup system brought online, the additional number of required CPUs to support the backup application is 8 (10 on originating−2 already allocated at the backup)
    - these 8 CPUs are dynamically provisioned from the grid/blade CPU pool by the backup for dedicated use at the time of switchover
    - when processing switches back to the primary system, the CPUs are returned to the reserve pool
- therefore, if the goal of the backup grid is to protect all data, and support at most one switchover from primary to backup, this can be done at a total cost of 20+8 on the backup system, which is only 28/80=35% of the cost of the source system This system becomes more efficient as the number of source databases grows, the requirement for simultaneously active backup databases is reduced, and the ratio of MR to SR increases.

Offloading processing, specifically reporting and similar query functions, to a secondary database can help:
  enable users to more freely access production data
  reduce the impact to production system users, improving response time
  enable the production system to support greater numbers of transactions (due to the offloading of query tasks)

The mechanism for doing so often involves data replication, sometimes between heterogeneous databases and possibly involving data transformation. In this context, replication systems apply database operations that apply on the source to the target in close to real time.

The reporting system must support two activities (and incur two costs), however:
  change replication of the source data into the target (cost is R)
  query activity by the users (cost is Q)

The total cost of such a system is Q+R. Assume that Q requires 2 CPUs, and single-row apply processing also requires 4 CPUs, for a total cost of 6 CPUs. However, if the efficiency of multi-row apply processing is 4 times that of single-row processing, the cost of R becomes 1 (4/4), and the total cost changes to 3 (2+1).

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable medium having sets of instructions stored thereon which, when executed by a machine, cause the machine to:
  receive multiple database operation commands from a database transaction application, wherein the multiple database operation commands are configured to be executed in a target database;
  fill, by the database transaction application, database command queues which include a portion of the multiple database operation commands;
  combine the contents of two or more of the multiple database command queues of the multiple database operation commands with similar operation types into multiple submission groups, wherein the combined contents of the two or more of the multiple database commands are executed as a single command, wherein the combining of the database command queues includes combining database command operations which execute the same database operation;
  identify dependencies between the multiple submission groups to designate priority submission groups and to apply priority submission groups to the target database substantially synchronously with the receipt of a continuous stream of database transactions, wherein a first submission group is dependent on a second submission group if the first group can only be executed sequentially after the second submission group; identify a circular dependency in database command operations and in response thereto, specify the execution of database command operations in the originally specified order until the circular dependency is removed;
  based on the identified dependencies between the multiple submission groups, designate an execution hierarchy of the multiple submission groups, wherein the execution hierarchy indicates an order of execution of the multiple submission groups based in part on predecessors and dependencies of the multiple database operations;
  apply, the multiple database operation commands in order of the execution hierarchy of the submission groups, to the database target substantially synchronously with the receipt of the multiple database operation commands; and
  receive the multiple database operation commands at the same time the database command queues are filled.

2. The computer readable medium of claim 1 wherein the executable instructions to receive include executable instructions to receive the multiple database operation commands from a transaction log of database operation commands.

3. The computer readable medium of claim 1 wherein the executable instructions to fill queues of database operation commands include executable instructions to fill database command queues of database transactions for execution related to different tables.

4. The computer readable medium of claim 1 wherein the executable instructions to apply include executable instructions to apply the multiple database command operations which execute the same database operation in a single database application program interface (API) call.

5. The computer readable medium of claim 1 wherein the executable instructions to apply include executable instructions to apply multiple row operations to the database target.

6. The computer readable medium of claim 1 wherein the executable instructions to apply include executable instructions to apply interleaved database command operations into distinct database transactions at the database target.

7. The computer readable medium of claim 1 further comprising executable instructions to designate the multiple submission groups that can be processed in parallel as parallel submission groups.

8. The computer readable medium of claim 7 wherein the executable instructions to apply include executable instructions to apply the parallel submission groups to multiple processing threads associated with the database target.

9. The computer readable medium of claim 1 further comprising executable instructions to specify that database command operations that update unique keys are performed in the originally specified sequence.

10. The computer readable medium of claim 1 further comprising executable instructions to break the multiple submission groups into multiple rounds of execution.

11. The computer readable medium of claim 1 further comprising executable instructions to specify that database command operations that require referential integrity be executed according to the referential integrity.

12. The computer readable medium of claim 1 further comprising executable instructions to detect and resolve data discrepancies caused by simultaneous updates to a database source row and a database target row.

13. The computer readable medium of claim 1 wherein the executable instructions are operative with a set of backup databases sharing a set of central processing unit and memory resources.

14. The computer readable medium of claim 13 wherein the set of backup databases are implemented using a high availability grid of backup database for a plurality of host systems.

15. A method comprising:
receiving multiple database operation commands from a database transaction application, wherein the multiple database operation commands are configured to be executed in a target database;
filling, by the database transaction application, database command queues which include a portion of the multiple database operation commands;
combining the contents of two or more of the multiple database command queues of the multiple database operation commands with similar operation types into multiple submission groups, wherein the combined contents of the two or more of the multiple database commands are executed as a single command;
identifying dependencies between the multiple submission groups to designate priority submission groups and to apply priority submission groups to the target database substantially synchronously with the receipt of a continuous stream of database transactions, wherein a first submission group is dependent on a second submission group if the first group can only be executed sequentially after the second submission group; identifying a circular dependency in database command operations and in response thereto, specify the execution of database command operations in the originally specified order until the circular dependency is removed;
specifying that database command operations to the same row of the target database that occur more than once are performed in the originally specified sequence;
based on the identified dependencies between the multiple submission groups, designating an execution hierarchy of the multiple submission groups, wherein the execution hierarchy indicates an order of execution of the multiple submission groups based in part on predecessors and dependencies of the multiple database operations;
applying, the multiple database operation commands in order of the execution hierarchy of the submission groups, to the database target substantially synchronously with the receipt of the multiple database operation commands; and
receiving the multiple database operation commands at the same time the database command queues are filled.

16. A non-transitory computer readable medium having sets of instructions stored thereon which, when executed by a machine, cause the machine to:
receive multiple database operation commands from a database transaction application, wherein the multiple database operation commands are configured to be executed in a target database;
fill, by the database transaction application, database command queues which include a portion of the multiple database operation commands;
combine the contents of two or more of the multiple database command queues of the multiple database operation commands with similar operation types into multiple submission groups, wherein the combined contents of the two or more of the multiple database commands are executed as a single command;
identify dependencies between the multiple submission groups to designate priority submission groups and to apply priority submission groups to the target database substantially synchronously with the receipt of a continuous stream of database transactions, wherein a first submission group is dependent on a second submission group if the first group can only be executed sequentially after the second submission group;
identify a circular dependency in database command operations and in response thereto, specify the execution of database command operations in the originally specified order until the circular dependency is removed;
based on the identified dependencies between the multiple submission groups, designate an execution hierarchy of the multiple submission groups, wherein the execution hierarchy indicates an order of execution of the multiple submission groups based in part on predecessors and dependencies of the multiple database operations;
apply the multiple database operation commands in order of the execution hierarchy of the submission groups to the database target substantially synchronously with the receipt of the multiple database operation commands; and
receive the multiple database operation commands at the same time the database command queues are filled.

* * * * *

UNITED STATES PATENT AND TRADEMARK OFFICE
CERTIFICATE OF CORRECTION

PATENT NO. : 8,032,885 B2  
APPLICATION NO. : 11/249055  
DATED : October 4, 2011  
INVENTOR(S) : Fish Page 1 of 1

It is certified that error appears in the above-identified patent and that said Letters Patent is hereby corrected as shown below:

In column 7, line 39, delete "database1would" and insert -- database1 would --, therefor.

In column 7, line 41, delete "database2would" and insert -- database2 would --, therefor.

In column 7, line 45, delete "database1and" and insert -- database1 and --, therefor.

In column 7, line 46, delete "database1is" and insert -- database1 is --, therefor.

In column 7, line 52, delete "database1to" and insert -- database1 to --, therefor.

In column 7, line 58, delete "database1to" and insert -- database1 to --, therefor.

In column 7, line 64, delete "database2would" and insert -- database2 would --, therefor.

In column 16, line 8, delete "a but" and insert -- but --, therefor.

In column 16, line 34, delete "Part ID." And insert -- PartID. --, therefor.

Signed and Sealed this  
Third Day of January, 2012

David J. Kappos  
*Director of the United States Patent and Trademark Office*